(12) United States Patent
Wirtzberger et al.

(10) Patent No.: US 7,719,809 B2
(45) Date of Patent: May 18, 2010

(54) METHOD AND APPARATUS FOR DISTRIBUTING ELECTRICAL POWER

(75) Inventors: Paul A. Wirtzberger, Greenville, TX (US); Gary Williams, Rowlett, TX (US); Rico Brooks, McKinney, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 531 days.

(21) Appl. No.: 11/519,635

(22) Filed: Sep. 12, 2006

(65) Prior Publication Data

US 2008/0062730 A1 Mar. 13, 2008

(51) Int. Cl.
*H02H 3/00* (2006.01)
*H02J 1/10* (2006.01)

(52) U.S. Cl. .............................. 361/84; 361/82; 363/65
(58) Field of Classification Search .................... 363/50, 363/53, 55, 56.01, 65, 67, 69, 70, 71, 56.03; 323/271; 361/82, 84
See application file for complete search history.

(56) References Cited

U.S. PATENT DOCUMENTS

| | | | | |
|---|---|---|---|---|
| 5,283,707 | A * | 2/1994 | Conners et al. | 361/58 |
| 5,973,419 | A * | 10/1999 | Kruppa et al. | 307/131 |
| 6,147,472 | A * | 11/2000 | Hewes et al. | 320/135 |
| 6,594,163 | B2 * | 7/2003 | Tsai | 363/50 |
| 6,600,239 | B2 * | 7/2003 | Winick et al. | 307/85 |
| 6,738,270 | B2 * | 5/2004 | Saga et al. | 363/50 |
| 6,771,478 | B2 | 8/2004 | Ochi | |
| 6,788,088 | B2 * | 9/2004 | Throngnumchai | 324/763 |
| 7,049,796 | B2 * | 5/2006 | Cherniski et al. | 323/271 |
| 7,265,525 | B2 * | 9/2007 | Xu et al. | 323/271 |
| 2004/0177201 | A1 | 9/2004 | Cherniski et al. | |

OTHER PUBLICATIONS

Texas Instruments, "Power Interface Products, ATCA AMC Hot Swap Reference Design Using TPS2490 and TPS2331," 2004, pp. 1-4.
Texas Instruments, "Positive High-Voltage Power-Limiting Hotswap Controller," 2002-2003, pp. 1-17, "Package Option Addendum", May 19, 2005, pp. 1-3.

* cited by examiner

*Primary Examiner*—Jessica Han
*Assistant Examiner*—Emily Pham

(57) ABSTRACT

A method and apparatus for distributing electrical power is provided. In one embodiment, the apparatus includes: a semiconductor switch adapted to receive input power from a DC power source, adapted to distribute power to a DC/DC module, and adapted to receive a control signal, a charge storage device in operative communication with the semiconductor switch and a return path associated with the DC power source, and a reverse current monitoring logic in operative communication with the semiconductor switch. In this embodiment, the reverse current monitoring logic is adapted to detect reverse current flowing in the semiconductor switch and, in response to detecting the reverse current, is adapted to open the semiconductor switch. Several embodiments of a method of distributing electrical power to a DC load are also provided.

16 Claims, 10 Drawing Sheets

METHOD AND APPARATUS FOR DISTRIBUTING ELECTRICAL POWER

BACKGROUND

Electronic assemblies require reliable power distribution circuits to distribute electrical power from a DC power source to one or more DC loads. To distribute such power, power distribution circuits having a plurality of parallel DC/DC modules and corresponding controller modules have been employed. One desired feature of these power distribution circuits is that they ensure the corresponding DC load is provided with electrical power that meets its operating requirements, even when one or more of the DC/DC modules and/or controller circuits fail in certain modes, such as a short circuit in relation to an input of the DC/DC module.

SUMMARY

In one aspect, a controller module for a power distribution circuit is provided. In one embodiment, the controller module includes: a semiconductor switch adapted to receive input power from a DC power source, adapted to distribute power to a DC/DC module, and adapted to receive a control signal, a charge storage device in operative communication with the semiconductor switch and a return path associated with the DC power source, and a reverse current monitoring logic in operative communication with the semiconductor switch. The reverse current monitoring logic is adapted to detect reverse current flowing in the semiconductor switch. In response to detecting the reverse current, the reverse current monitoring logic is adapted to send an open control signal to the semiconductor switch.

DESCRIPTION OF EMBODIMENTS

Figure 1:
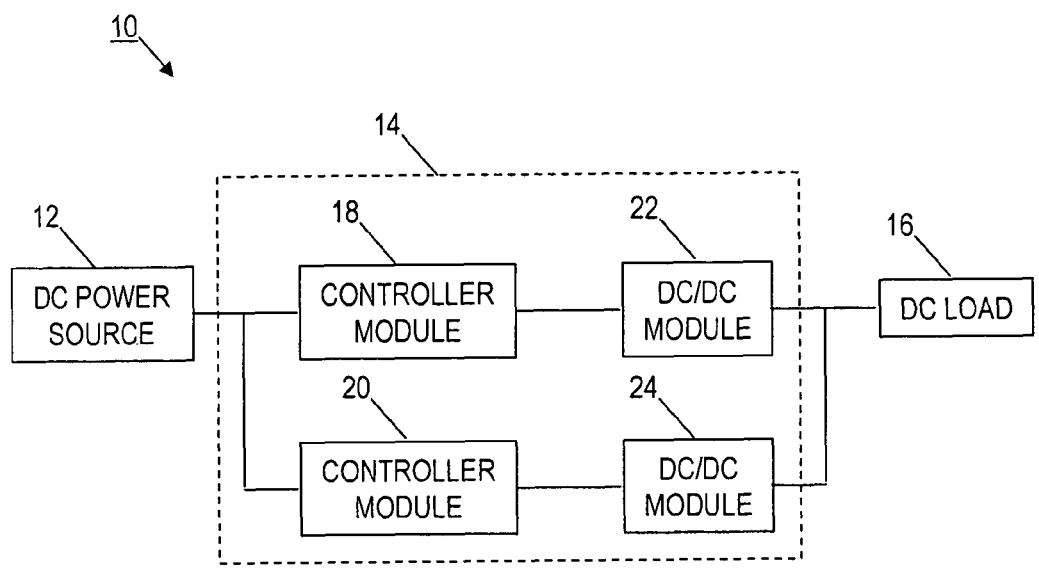
FIG. 1 is a block diagram of an exemplary embodiment of an electronic assembly according to the present invention.

The following includes definitions of exemplary terms used herein. Both singular and plural forms of all terms fall within each meaning.

"Semiconductor switch" as used herein includes, but is not limited to, a device for selectively making, breaking, or changing the connections in an electrical circuit made, at least in part, of semiconductor material.

"Charge storage device" as used herein includes, but is not limited to, a passive device, such as a capacitor, that charges and holds the charge when connected to an electrical voltage higher than its current charge and discharges when connected to an electrical voltage less than its current charge.

"Forward current" as used herein includes, but is not limited to, electrical current flowing through a particular branch of a DC electrical circuit in a normal direction during normal operation.

"Forward current monitoring logic" as used herein includes, but is not limited to, a circuit that senses an amount of current flowing through a particular branch of a DC electrical circuit and compares the sensed current to a threshold current associated with normal operation.

"Reverse current" as used herein includes, but is not limited to, electrical current flowing through a particular branch of a DC electrical circuit in a direction opposite that of normal operation during certain types of failure modes.

"Reverse current monitoring logic" as used herein includes, but is not limited to, a circuit that senses an amount of current flowing through a particular branch of a DC electrical circuit and compares the sensed current to a threshold current associated with certain types of failure modes that cause current to flow in a direction opposite that of normal operation.

"Short circuit protection device" as used herein includes, but is not limited to, a device, such as a fuse or circuit breaker, that electrically opens a connection between an input (IN) terminal and an output (O) terminal in response to abnormal current flow for a predetermined time.

"Circuit," as used herein, includes, but is not limited to necessarily require, hardware, firmware, software or combinations of each to perform a function(s) or an action(s). For example, based on a desired feature or need, a circuit may include a software controlled microprocessor, discrete logic such as an application specific integrated circuit (ASIC), or other programmed logic device. A circuit may also be fully embodied as software. As used herein, "circuit" is considered synonymous with "logic."

"Comprising," "containing," "having," and "including," as used herein, except where noted otherwise, are synonymous and open-ended. In other words, usage of any of these terms (or variants thereof) does not exclude one or more additional elements or method steps from being added in combination with one or more enumerated elements or method steps.

"Logic," as used herein, includes, but is not limited to, hardware, firmware, software or combinations of each to perform a function(s) or an action(s), or to cause a function or action from another component. For example, based on a desired application or need, logic may include a software controlled microprocessor, discrete logic such as an application specific integrated circuit (ASIC), or other programmed logic device. Logic may also be fully embodied as software.

As used herein, "logic" is considered synonymous with "circuit."

"Operative communication," as used herein, includes, but is not limited to, a communicative relationship between devices, logic, or circuits. Direct electrical, electromagnetic, and optical connections and indirect electrical, electromagnetic, and optical connections are examples of such communications. Two devices are in operative communication if a signal from one is received by the other, regardless of whether the signal is modified by some other device. For example, two devices separated by one or more of the following: i) amplifiers, ii) filters, iii) transformers, iv) optical isolators, v) digital or analog buffers, vi) analog integrators, vii) other electronic circuitry, viii) fiber optic transceivers, ix) Bluetooth communications links, x) 802.11 communications links, xi) satellite communication links, and xii) other wireless communication links. As another example, an electromagnetic sensor is in circuit communication with a signal if it receives electromagnetic radiation from the signal. As a final example, two devices not directly connected to each other, but both capable of interfacing with a third device, e.g., a CPU, are in operative communication.

"Or," as used herein, except where noted otherwise, is inclusive, rather than exclusive. In other words, "or" is used to describe a list of alternative things in which one may choose one option or any combination of alternative options. For example, "A or B" means "A or B or both" and "A, B, or C" means "A, B, or C, in any combination." If "or" is used to indicate an exclusive choice of alternatives or if there is any limitation on combinations of alternatives, the list of alternatives specifically indicates that choices are exclusive or that certain combinations are not included. For example, "A or B, but not both" is used to indicated use of an exclusive "or" condition. Similarly, "A, B, or C, but no combinations" and "A, B, or C, but not the combination of A, B, and C" are examples where certain combination of alternatives are not included in the choices associate with the list.

"Signal," as used herein, includes, but is not limited to, one or more electrical signals, analog or digital signals, one or more computer instructions, a bit or bit stream, or the like.

In various embodiments, an apparatus for distributing electrical power includes reverse current monitoring logic. The apparatus may also include soft start logic, forward current monitoring logic, and/or a short circuit protection device. The reverse current monitoring logic prevents a hold-up voltage associated with a charge storage device from depleting due to a short circuit condition in certain other portions of the apparatus. The soft start logic controls the application of a source DC voltage to other portions of the apparatus during a hot plug event to limit startup current. The forward current monitoring logic monitors current flowing through certain branches of the apparatus for certain types of over-current conditions. The short circuit protection device protects at least certain portions of the apparatus from damage due to short circuits associated with certain portions of the apparatus.

These features may be implemented individually or in any combination. For example, these features can provide high availability power solutions with, for example, hot swap capabilities, fusing, and OR'ing diodes which provide fault isolation and inrush current control. All these features may be combined in a single integrated circuit (IC) that operates in conjunction with, for example, a field-effect transistor (FET). This decreases the component count (e.g., diode, diode heat sink, fuse, dc/dc input capacitance) and reduces the board space required by discreet component solutions.

Forward current monitoring may be accomplished, for example, by taking a voltage drop across a sense resistor and comparing the sensed voltage to a reference voltage via, for example, a comparator. If the sensed voltage exceeds the reference voltage, a semiconductor switch, such as an FET, is opened due to excess overload current. This circuit is not required to latch the semiconductor switch open after the overload current is sensed.

Reverse current monitoring may be accomplished, for example, by taking a voltage drop across a semiconductor switch (e.g., FET) or a sense resistor depending on whether the semiconductor switch is open (i.e., high impedance) or closed (i.e., low impedance). For example, if the voltage is positive, the flow of current is in the forward or normal direction. Conversely, in this example, if the voltage is negative, the flow of current is in the reverse direction due to, for example, a short circuit failure mode in a parallel controller module. If the reverse current monitoring logic determines current is flowing in the reverse direction, the semiconductor switch is latched open due to the short circuit failure mode. The reverse current monitoring logic continues sensing the reverse current through the sense resistor until the short circuit is cleared, for example, by a short circuit protection device opening and disconnecting the short circuit. After the reverse current stops, the reverse current monitoring logic allows the semiconductor switch to turn back on.

These features provide a controller that: i) requires fewer components and less printed circuit board space for control of power distribution and current monitoring and ii) decreases the required size of hold-up capacitance due to faster fault isolation of certain short circuit failure modes.

With reference to FIG. 1, an embodiment of an electronic assembly 10 includes a DC power source 12, a power distribution circuit 14 in operative communication with the DC power source 12, and a DC load 16 in operative communication with the power distribution circuit 14. In one embodiment, the power distribution circuit 14 includes a first controller module 18, a second controller module 20, a first DC/DC module 22 in operative communication with the first controller module 18, and a second DC/DC module 24 in operative communication with the second controller module 20. The first and second controller modules 18, 20 are in operative communication with the DC power source 12. The first and second DC/DC modules 22, 24 are in operative communication with the DC load 16.

The combination of the first controller module 18 and first DC/DC module 22 forms a first power distribution path to the DC load 16. The combination of the second controller module 20 and second DC/DC module 24 forms a second power distribution path to the DC load 16. The first and second power distribution paths are in parallel. If both power distribution paths are sized to independently support the DC load 16, each power distribution path serves as a redundant backup path to the other.

Alternate embodiments of the power distribution circuit 14 may include additional controller and DC/DC modules to provide additional power distribution paths to the DC load 16. For example, if three power distribution paths are provided, each power distribution path may be sized to provide 50% of the current capacity required by the DC load 16. This configuration provides one redundant backup power distribution path. Alternatively, each of the three power distribution paths may be sized to independently support the DC load 16. This arrangement provides two redundant backup power distribution paths. As additional power distribution paths are added, similar logic can be used to balance a desired level of redundancy with economic considerations. For example, a configuration with five power distribution paths may have from one to four redundant paths depending on the desired level of redundancy and cost implications.

Figure 2:
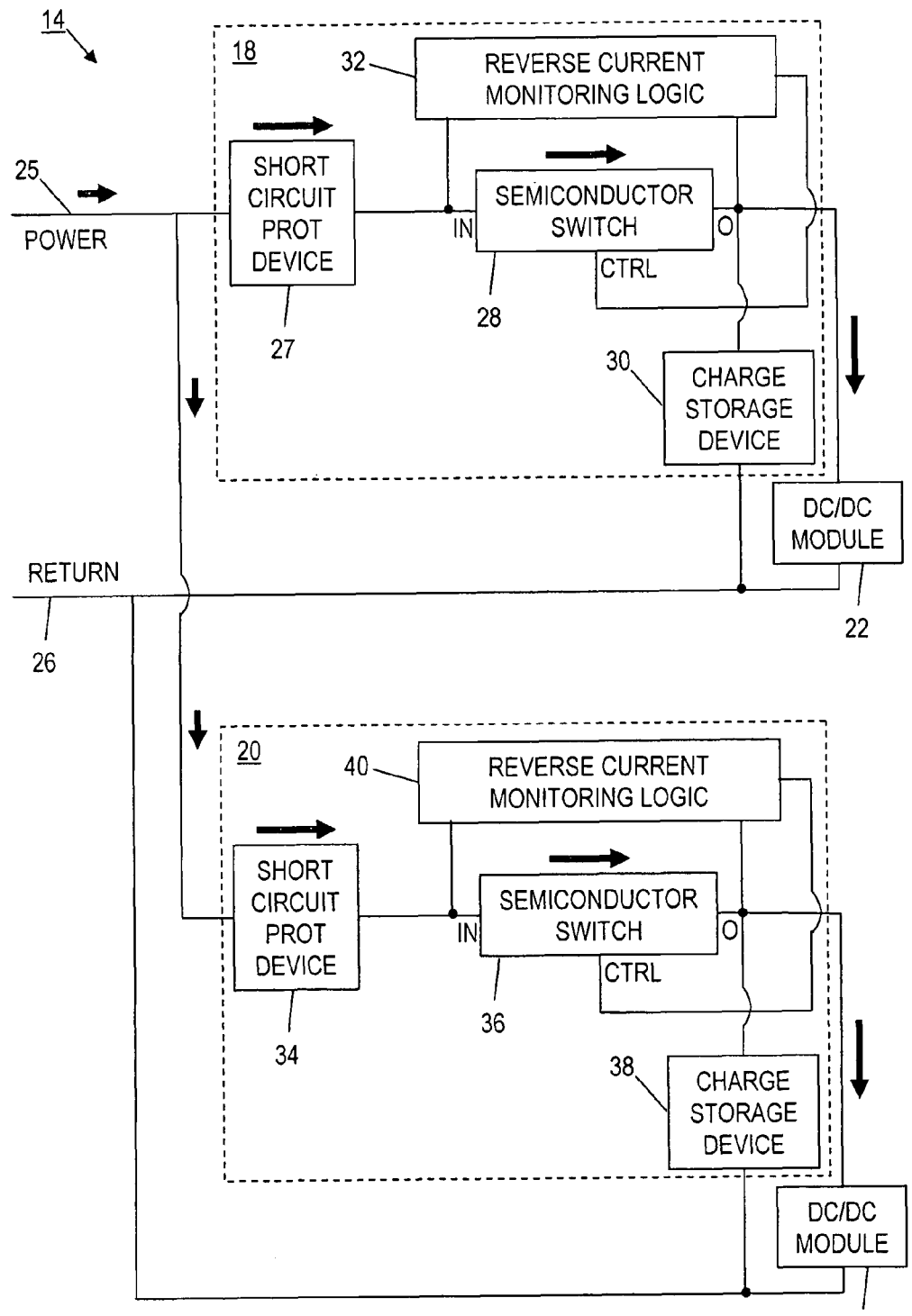
FIG. 2 is a block diagram of an exemplary embodiment of a power distribution circuit according to the present invention with annotation of certain current flows during normal steady-state operation.

With reference to FIG. 2, an embodiment of the power distribution circuit 14 includes the first controller module 18, second controller module 20, first DC/DC module 22, and second DC/DC module 24 configured as described above with reference to FIG. 1. The first and second controller modules 18, 20 are in operative communication with a power line 25 (e.g., 48 vdc) and a return line 26 associated with a DC power source, such as item 12 (FIG. 1). The return line 26 is connected to a common terminal at the DC power source 12 (FIG. 1) and carries return current from the power line 25 to the DC power source. The inputs to the DC/DC modules 22, 24 receive power from the corresponding controller modules 18, 20 and are in operative communication with the return line 26 associated with the DC power source 12 (FIG. 1). The outputs (e.g., 12 vdc, 5 vdc, etc.) of the DC/DC modules 22, 24 are isolated from the inputs and provide electrical power to a DC load, such as item 16 (FIG. 1).

The first controller module 18 includes a short circuit protection device 27, a semiconductor switch 28 in operative communication with the short circuit protection device 27, a charge storage device 30 in operative communication with the semiconductor switch 28, and a reverse current monitoring logic 32 in operative communication with input (IN), output (O), and control (CTRL) terminals of the semiconductor switch 28. The second controller module 20 includes a short circuit protection device 34, a semiconductor switch 36 in operative communication with the short circuit protection device 34, a charge storage device 38 in operative communication with the semiconductor switch 36, and a reverse current monitoring logic 40 in operative communication with input (IN), output (O), and control (CTRL) terminals of the semiconductor switch 36.

The short circuit protection devices 27, 34 are in operative communication with the power line 25 (e.g., 48 vdc). The charge storage devices 30, 38 are in operative communication with the return line 26. The semiconductor switches 28, 36 provide power to the corresponding inputs of the DC/DC modules 22, 24.

The arrows in the diagram indicate the normal flow of certain currents from the DC power source 12 (FIG. 1) through the controller modules 18, 20 to the inputs of the DC/DC modules 22, 24 during steady state operation of the power distribution circuit 14 with the semiconductor switches 28, 36 closed. As shown, current flows from the power line 25 to the DC/DC modules 22, 24 via the corresponding short circuit protection devices 27, 34 and semiconductor switches 28, 36. This normal flow of current may be referred to as forward current through the semiconductor switch 28, 36 and related current paths.

During steady state operation, the charge storage devices 30, 38 are at least theoretically fully charged to the voltage developed across the corresponding inputs to the DC/DC modules 22, 24. Therefore, theoretically no current is flowing through the charge storage devices 30, 38 during steady state operation. In practice, it is understood that the charge storage devices 30, 38 will respond to fluctuations in the voltage across the corresponding inputs to the DC/DC modules 22, 24 in a regulating manner. That is, if the voltage increases, the corresponding charge storage device will charge until the increased voltage level is stored and, if the voltage decreases, the corresponding charge storage device will discharge until the decreased voltage level is reached.

Figure 3:
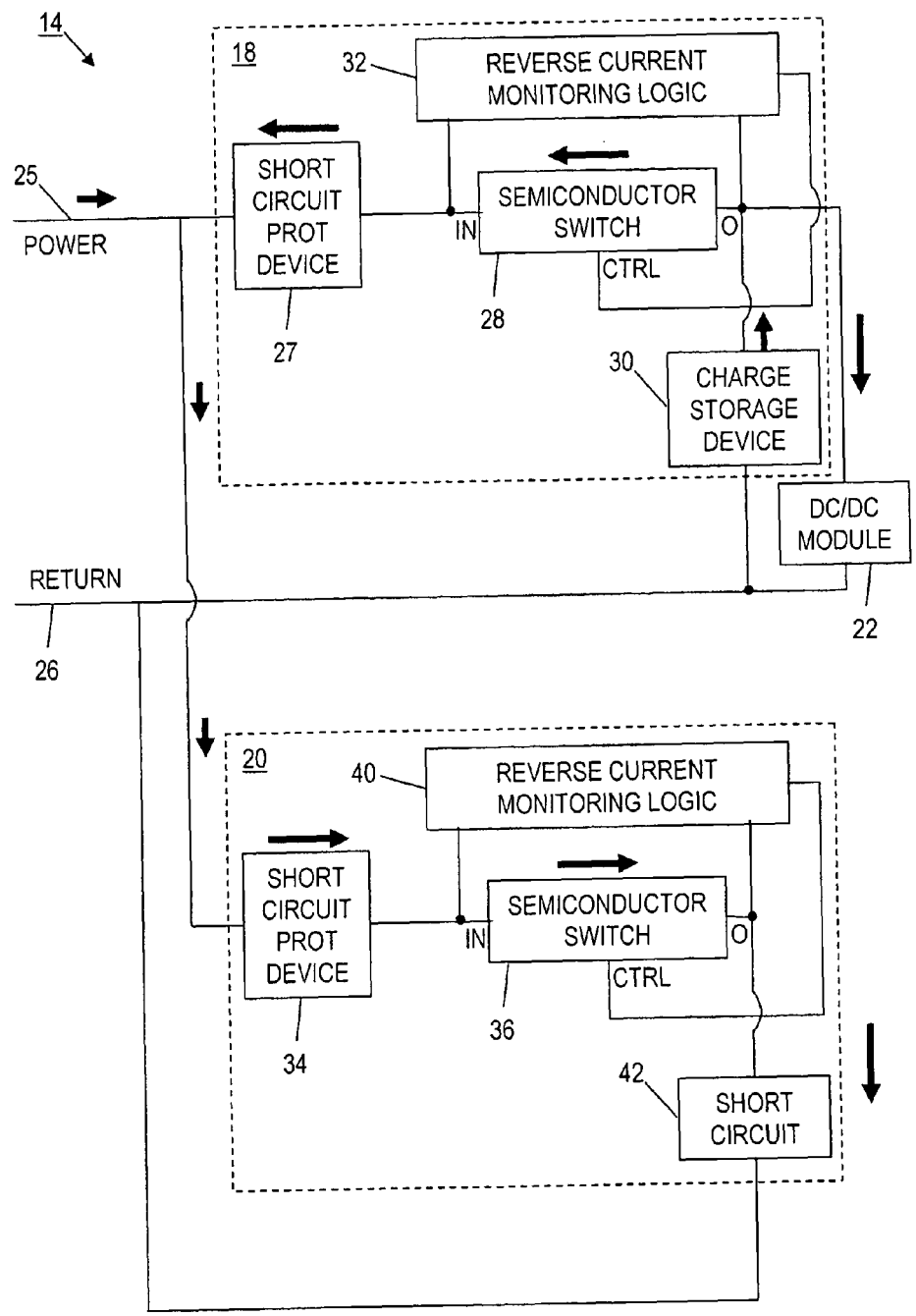
FIG. 3 is a block diagram of the power distribution circuit of FIG. 2 with annotation of certain current flows at the onset of a short circuit failure mode.

With reference to FIG. 3, a short circuit 42 has developed in the power distribution circuit 14 in relation to the charge storage device 38 (FIG. 2) of the second controller module 20 and the input to the second DC/DC module 24 (FIG. 2) during steady state operation. The arrows in the diagram indicate the flow of certain currents at the onset of this short circuit failure mode. As shown, in addition to shorting the input to the second DC/DC module 24 (FIG. 2), the short circuit 42 initially shorts the input to the first controller module 18. This causes the charge storage device 30 to discharge current toward the short circuit 42. The charge storage device 30 also discharges some current toward the first DC/DC module 22. The current discharged toward the short circuit 42 flows through the semiconductor switch 28 and short circuit protection device 27 of the first controller module 18 in the opposite direction to the normal or forward current depicted in FIG. 2. This opposite current may be referred to as reverse current through the semiconductor switch and related circuit.

The reverse current joins current flowing from the DC power source 12 (FIG. 1) toward the short circuit 42 and continues through the short circuit protection device 34 and semiconductor switch 36 of the second controller module 20 to the short circuit 42 and return line 26.

The reverse current monitoring logic 32 of the first controller module 18 senses that reverse current is flowing through the semiconductor switch 28. This may be accomplished, for example, by sensing the voltage across the semiconductor switch 28 and distinguishing a polarity associated with forward current from an opposite polarity associated with reverse current. Of course, other methods of sensing current through the semiconductor switch 36 and detecting reverse current may also be implemented by the reverse current monitoring logic 32.

As this short circuit failure mode scenario is developed over FIGS. 3-6, one will recognize that the short circuit protection circuit 27 in the first controller module 18 and the semiconductor switch 36, charge storage device 38, and reverse current monitoring logic 40 of the second controller module 20 are optional. More generally, the semiconductor switch, charge storage device, and reverse current monitoring logic are optional in the power distribution path exhibiting the short circuit and the short circuit protection circuit is optional in the other power distribution path(s) associated with the power distribution circuit. Nevertheless, although not required, it may be more practical to implement standardized controller modules that are interchangeable at least within the same power distribution circuit. Additionally, it may be more practical to provide reciprocal redundancy among multiple power distribution paths of a given power distribution circuit by standardizing the controller modules across all paths. However, one embodiment may, for example, provide power distribution path A as a redundant path for failures in power distribution path B without necessarily providing the reciprocal redundancy (i.e., power distribution path B is not a redundant path for failures in power distribution path A) by providing different controller modules in paths A and B.

Figure 4:
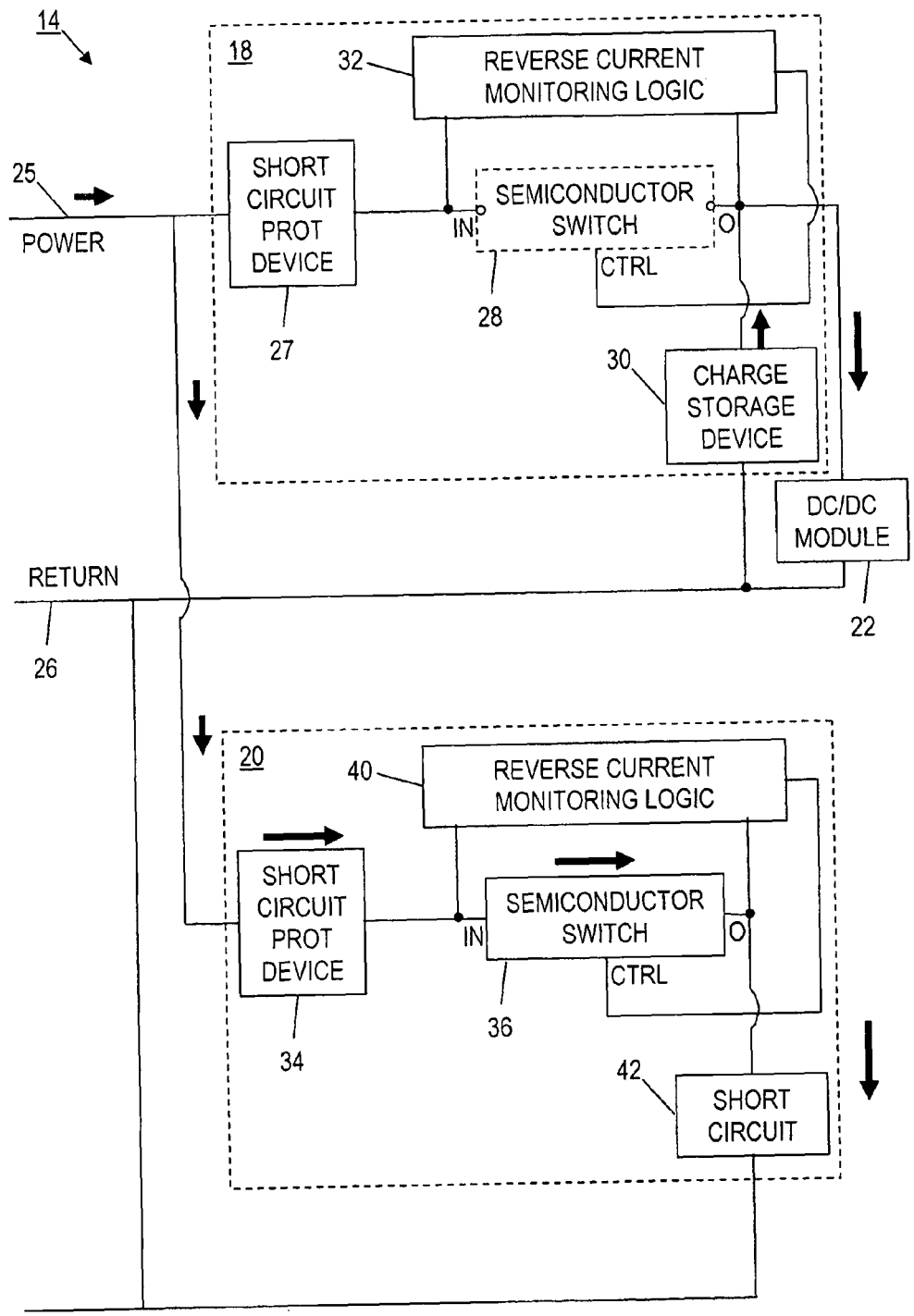
FIG. 4 is a block diagram of the power distribution circuit of FIG. 2 with annotation of certain current flows during a first transitioning period after onset of the short circuit failure mode of FIG. 3.

With reference to FIG. 4, a first transitioning period after onset of the short circuit 42 begins when the reverse current monitoring logic 32 of the first controller module 18 provides a signal to the control (CTRL) terminal of the semiconductor switch 28 to cause it to open and disconnect the charge storage device 30 from the short circuit 42. At this point, the charge storage device 30 continues discharging through the first DC/DC module 22. Ideally, the discharge current is sufficient to support the electrical power required by the first DC/DC module 22 and the DC load 16 (FIG. 1) until the short circuit 42 is removed from the power distribution circuit 14 and the semiconductor switch 28 is closed again for safe, steady-state operation (see FIG. 6). As described above, in other embodiments with additional redundant power distribution paths, the discharge current from two or more charge storage devices 30, etc. may be combined to support the electrical power required by the DC/DC modules 22, etc. and the DC load 16 (FIG. 1).

Figure 5:
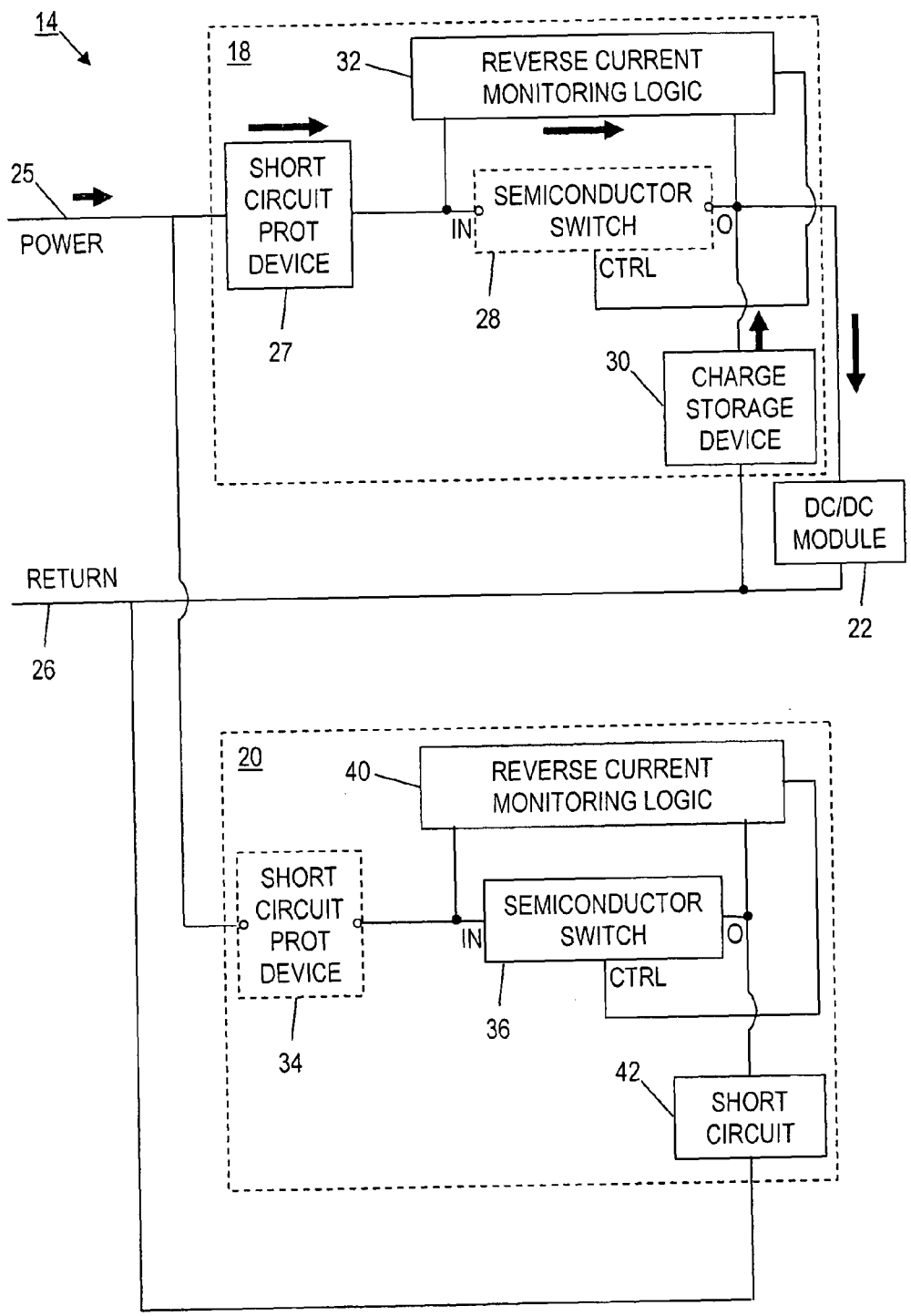
FIG. 5 is a block diagram of the power distribution circuit of FIG. 2 with annotation of certain current flows during a second transitioning period after onset of the short circuit failure mode of FIG. 3.

As shown in FIG. 4, current continues to flow from the DC power source 12 (FIG. 1) to the short circuit 42 via the short circuit protection device 34. Eventually, the short circuit protection device 34 of the second controller module 20 opens in response to the short circuit current. This disconnects the short circuit 42 from the first controller module 18 as shown in FIG. 5 and stops the short circuit current. Nevertheless, the charge storage device 30 continues discharging through the first DC/DC module 22 during this second stage of the transitioning period after onset of the short circuit failure mode continuing to provide a source of power to the DC load 16 (FIG. 1).

With reference to FIG. 5, the reverse current monitoring logic 32 detects when the short circuit current stops flowing. For example, the reverse current monitoring logic 32 may include a high impedance resistor across the semiconductor switch 28 that permits some reverse current to flow as long as the short circuit 42 is still connected to the first controller module 18. In this configuration, the reverse current monitoring logic 32 may sense a voltage across the resistor and distinguish a polarity associated with forward current from a polarity associated with reverse current. When the short circuit protection circuit 34 opens, the power line 25 from the DC power source 12 (FIG. 1) provides power to the sensing resistor in the reverse current monitoring logic 32 via the short circuit protection device 27. This causes some forward current to flow through the sensing resistor to the first DC/DC module 22.

Of course other methods of sensing current through the reverse current monitoring logic 32 and detecting forward current may also be implemented by the reverse current monitoring logic 32. Additionally, other methods of detecting that the short circuit 42 has been disconnected from the first controller module 18 may also be implemented by the reverse current monitoring logic 32. For example, the voltage at the input (IN) terminal of the semiconductor switch 28 may be compared to the voltage at the output (O) terminal.

Figure 6:
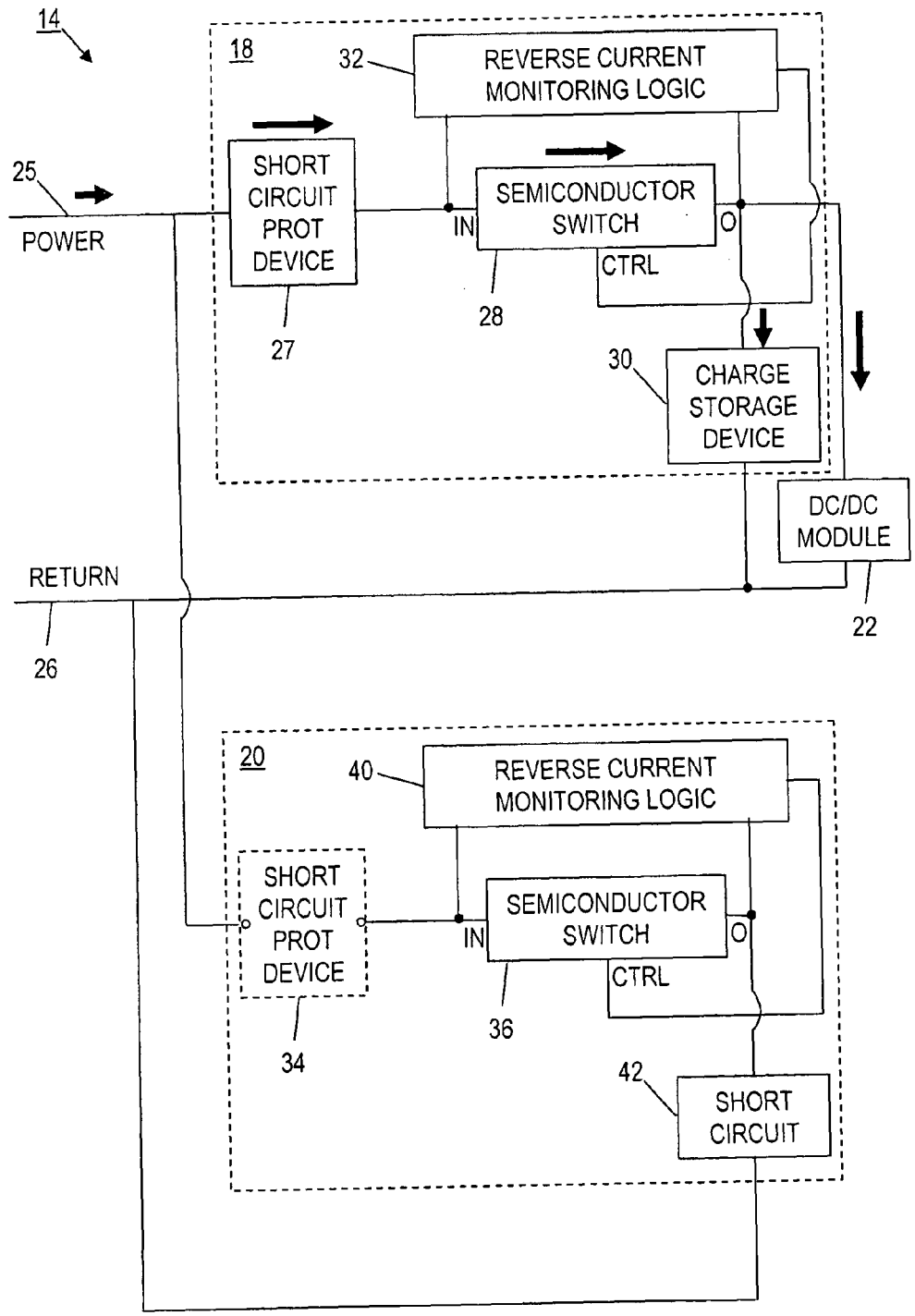
FIG. 6 is a block diagram of the power distribution circuit of FIG. 2 with annotation of certain current flows during steady-state operation after onset of the short circuit failure mode of FIG. 3.

After the reverse current monitoring logic 32 detects that the short circuit 42 has been disconnected from the first controller module 18, the reverse current monitoring logic 32 removes that signal from the control (CTRL) terminal of the semiconductor switch 28 that was causing the semiconductor switch 28 to effectively be latched open. Removing the signal from the control (CTRL) terminal enables the semiconductor switch 28 to close as shown in FIG. 6 and begins steady state operation again after onset of the short circuit failure mode. Alternatively, the reverse current monitoring logic 32 may apply a signal to control (CTRL) terminal causing the semiconductor switch to close and remove the signal when reverse current is sensed as described above with reference to FIG. 4.

With reference to FIG. 6, forward current flows from the DC power source 12 (FIG. 1) to the first DC/DC module 22 via the short circuit protection device 27 and semiconductor switch 28. Initially, current will also flow toward the charge storage device 30 until it is charged to the voltage level across the input of the first DC/DC module 22. Once the charge storage device 30 is fully charged, the first controller module 18 and first DC/DC module 22 will operate in the same manner as described above with reference to FIG. 2. In the embodiment being described, the first DC/DC module 22 independently supports the DC load 16 (FIG. 1). The second controller module 20 and second DC/DC module 24 may be left inactive until a convenient time when repairs may be made to remove the short circuit 42 and replace or reset the short circuit protection device 34.

Figure 7:
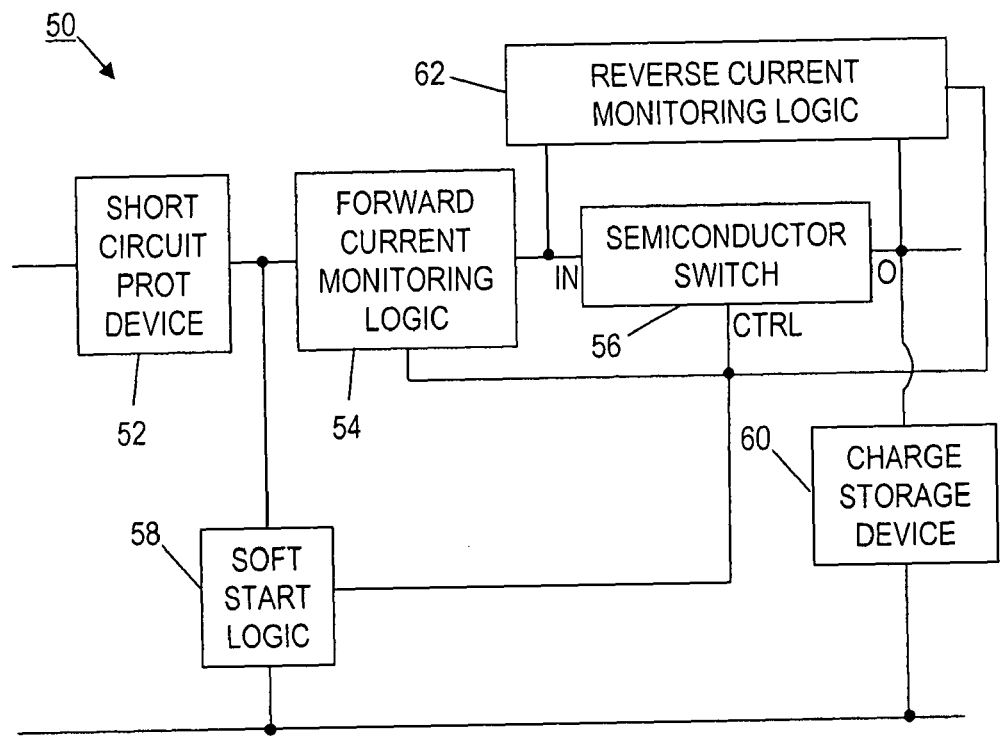
FIG. 7 is a block diagram of an exemplary embodiment of a controller module for a power distribution circuit according to the present invention.

With reference to FIG. 7, an embodiment of a controller module 50 includes a short circuit protection device 52, a forward current monitoring logic 54 in operative communication with the short circuit protection device 52, a semiconductor switch 56 in operative communication with the forward current monitoring logic 54, a soft start logic 58 in operative communication with the short circuit protection device 52 and semiconductor switch 56, a charge storage device 60 in operative communication with the semiconductor switch 56, and a reverse current monitoring logic 62 in operative communication with the forward current monitoring logic 54 and semiconductor switch 56. This embodiment of a controller module 50 may be used for any of the controller modules described above with reference to FIGS. 1-6. This controller module 50 or portions thereof may be referred to as a hot swap controller and may be used, for example, in a power distribution circuit on a circuit card assembly or another type of electronic assembly for which replacement or installation without shutting down power is desired. As shown by the controller modules described above with reference to FIGS. 1-6, the forward current monitoring logic 54 and soft start logic 58 are optional. The addition of these optional features to any of the controller modules described above permits those controller modules to also be used as hot swap controllers.

With continuing reference to FIG. 7, the semiconductor switch 56 includes input (IN), output (O), and control (CTRL) terminals. The semiconductor switch 56 may be opened or closed by certain signals applied to its control (CTRL) terminal. The soft start logic 58, forward current monitoring logic 54, and reverse current monitoring logic 62 may apply control signals to the control (CTRL) terminal of semiconductor switch 56. In one embodiment, the soft start logic 58, forward current monitoring logic 54, and reverse current monitoring logic 62 may be incorporated in an integrated circuit (IC).

The soft start logic 58 initially controls the semiconductor switch 56 when the associated electronic assembly is first connected to a power source. The soft start logic 58 slowly ramps the control signal to slowly ramp the semiconductor switch 56 from an open condition to a closed condition. This slowly ramps forward current through the semiconductor switch 56 from no current, when the semiconductor switch 56 is open, to a maximum current associated with a corresponding load, when the semiconductor switch 56 is closed.

The forward current monitoring logic 54 senses the forward current, compares the sensed current to a reference associated with an overload current threshold, and, when the sensed current exceeds the threshold, applies a control signal to the control (CTRL) terminal of the semiconductor switch 56 to open it and stop the excessive forward current.

The controller module 50 may be used in a power distribution circuit that incorporates two or more controller modules with corresponding DC/DC modules in parallel power distribution paths as described above with reference to FIG. 1. When the controller module 50 is used in conjunction with other parallel power distribution paths as described above, the reverse current monitoring logic 62 operates in the same manner as described above with reference to FIGS. 3-6.

Figure 8:
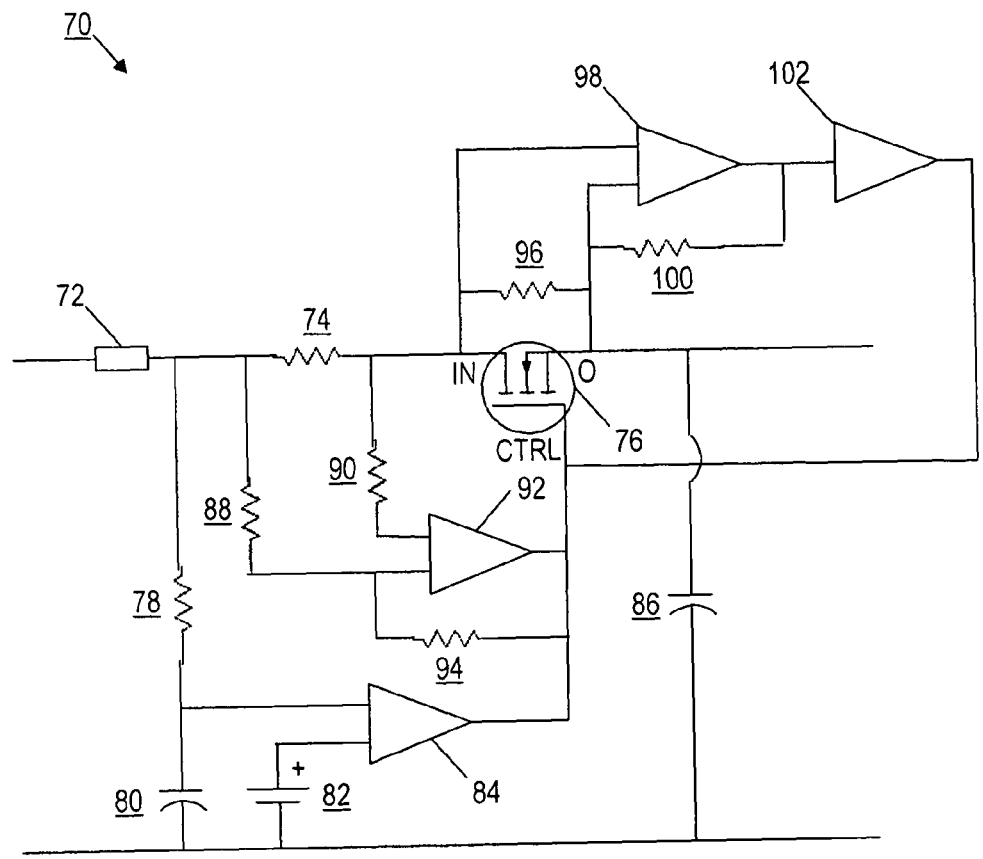
FIG. 8 is a schematic diagram of an exemplary embodiment of a controller module for a power distribution circuit according to the present invention.

With reference to FIG. 8, an embodiment of a controller module 70 includes a fuse 72, a first resistor 74, an N-channel metal oxide semiconductor field effect transistor (MOSFET) 76, a second resistor 78, a first capacitor 80, a reference voltage 82, a first comparator 84, a second capacitor 86, a third resistor 88, a fourth resistor 90, a second comparator 92, a fifth resistor 94, a sixth resistor 96, a third comparator 98, a seventh resistor 100, and a buffer amplifier 102.

With reference to FIGS. 8 and 7, the fuse 72 is an example of a short circuit protection device 52. The circuit formed by the first, third, fourth, and fifth resistors 74, 88, 90, 94 and second comparator 92 is an example of a forward current monitoring logic 54. The N-channel MOSFET 76 is an example of a semiconductor switch 56. The circuit formed by the second resistor 78, first capacitor 80, reference voltage 82, and first comparator 84 is an example of a soft start logic 58. The second capacitor 86 is an example of a charge storage device 60. The circuit formed by the sixth and seventh resistors 96, 100, third comparator 98, and buffer amplifier 102 is an example of a reverse current monitoring logic 62. As such, these components or groups of components in FIG. 8 operate in the same manner as the corresponding functional blocks described above with reference to FIGS. 2-7.

In particular, the first comparator 84 and associated components provide a ramped control signal to the control (CTRL) terminal of the N-channel MOSFET 76 when power is initially applied to the controller module 70. This enables the controller module 70 to be used as a hot swap controller as described above for the controller module 50 of FIG. 7.

The first resistor 74 develops a voltage drop from current flowing between the fuse 72 and the N-channel MOSFET 76. The voltage drop is used by the second comparator 92 in conjunction with the third and fourth resistors 88, 90 to sense forward current that exceeds a predetermined overload current threshold. When the forward current exceeds the overload current threshold, the second comparator 92 is triggered and a control signal is applied to the control (CTRL) terminal of the N-channel MOSFET 76 causing it to open or turn off.

The N-channel MOSFET 76 exhibits a voltage drop from its input (IN) terminal to its output (O) terminal when it is closed or on. This voltage drop is used by the third comparator 98 to detect when reverse current is flowing from the output (O) terminal to the input (IN) terminal. When reverse current is flowing, the third comparator 98 is triggered and the buffer amplifier 102 applies a control signal to the control (CTRL) terminal of the N-channel MOSFET 76 causing it to open or turn off. With the N-channel MOSFET 76 open, the sixth resistor 96 develops a voltage drop from current flowing between the first resistor 74 and second capacitor 86. The third comparator 98 uses this voltage drop to continue to detect reverse current flowing from the second capacitor 86 toward the first resistor 74. When reverse current is no longer flowing, the output of the third comparator 98 switches its level. This permits the N-channel MOSFET 76 to close or turn on. This sequence of operations follows the scenario for the short circuit failure mode described above with reference to FIGS. 3-6.

Figure 9:
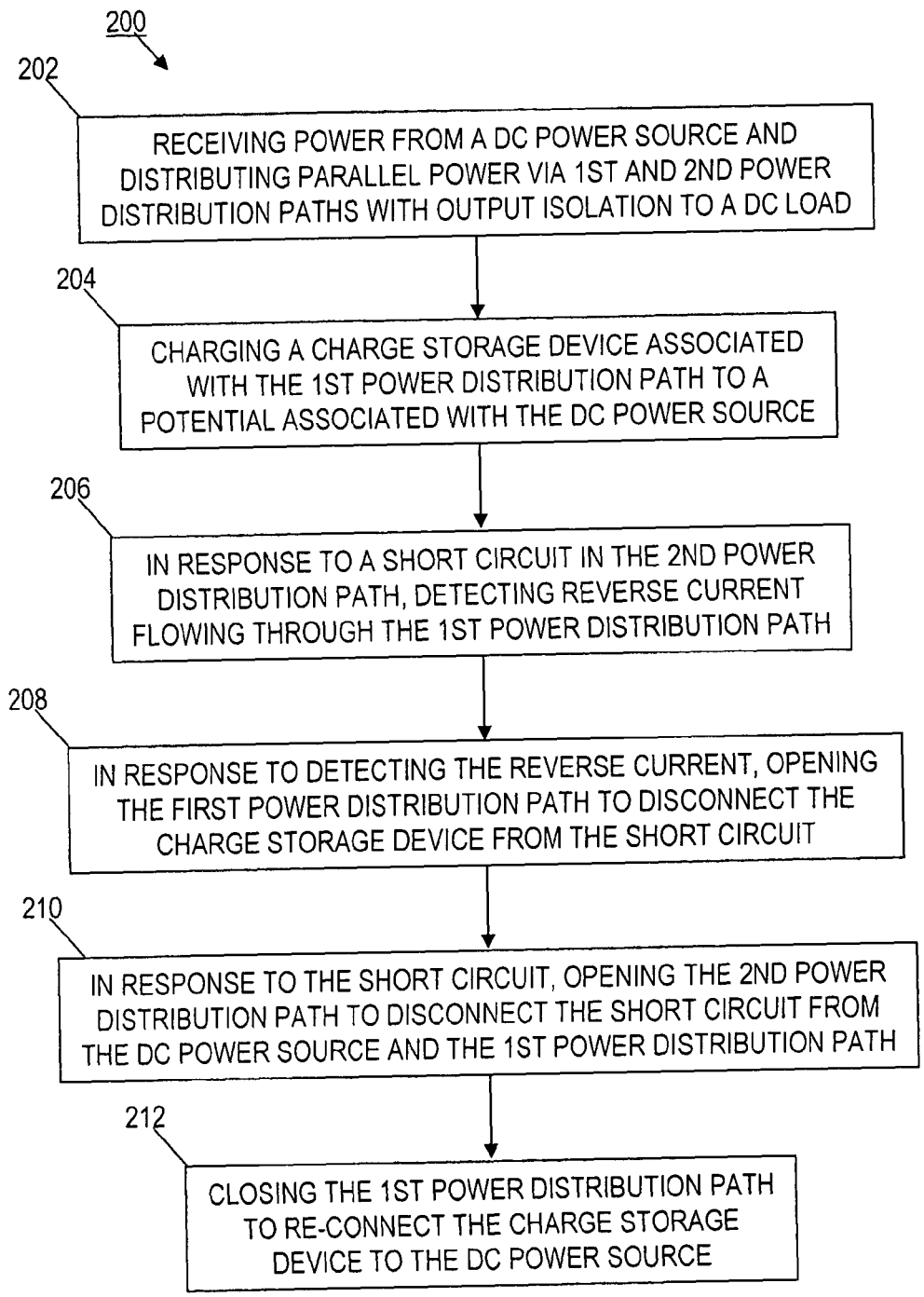
FIG. 9 is a flowchart of an exemplary embodiment of a process for distributing electrical power according to the present invention.

With reference to FIG. 9, an embodiment of a process 200 for distributing electrical power begins at 202 where power is received from a DC power source at inputs of first and second controller modules and parallel power is distributed to a DC load via outputs of first and second DC/DC modules. The output of each DC/DC module is isolated from the input of the module. At 204, a charge storage device of the first controller module is charged to a potential at an input of the first DC/DC module. Next, after a short circuit in the second controller module or an input of the second DC/DC module, reverse current flowing through a semiconductor switch of the first controller module is detected (206). At 208, in response to detection of the reverse current, the semiconductor switch is opened to disconnect the charge storage device from the second controller module. Next, in response to the short circuit, a short circuit protection device of the second controller module is opened to disconnect the short circuit from the first controller module (210). At 212, after the short circuit protection device opens, the semiconductor switch is closed to re-connect the charge storage device to the DC power source.

Figure 10:
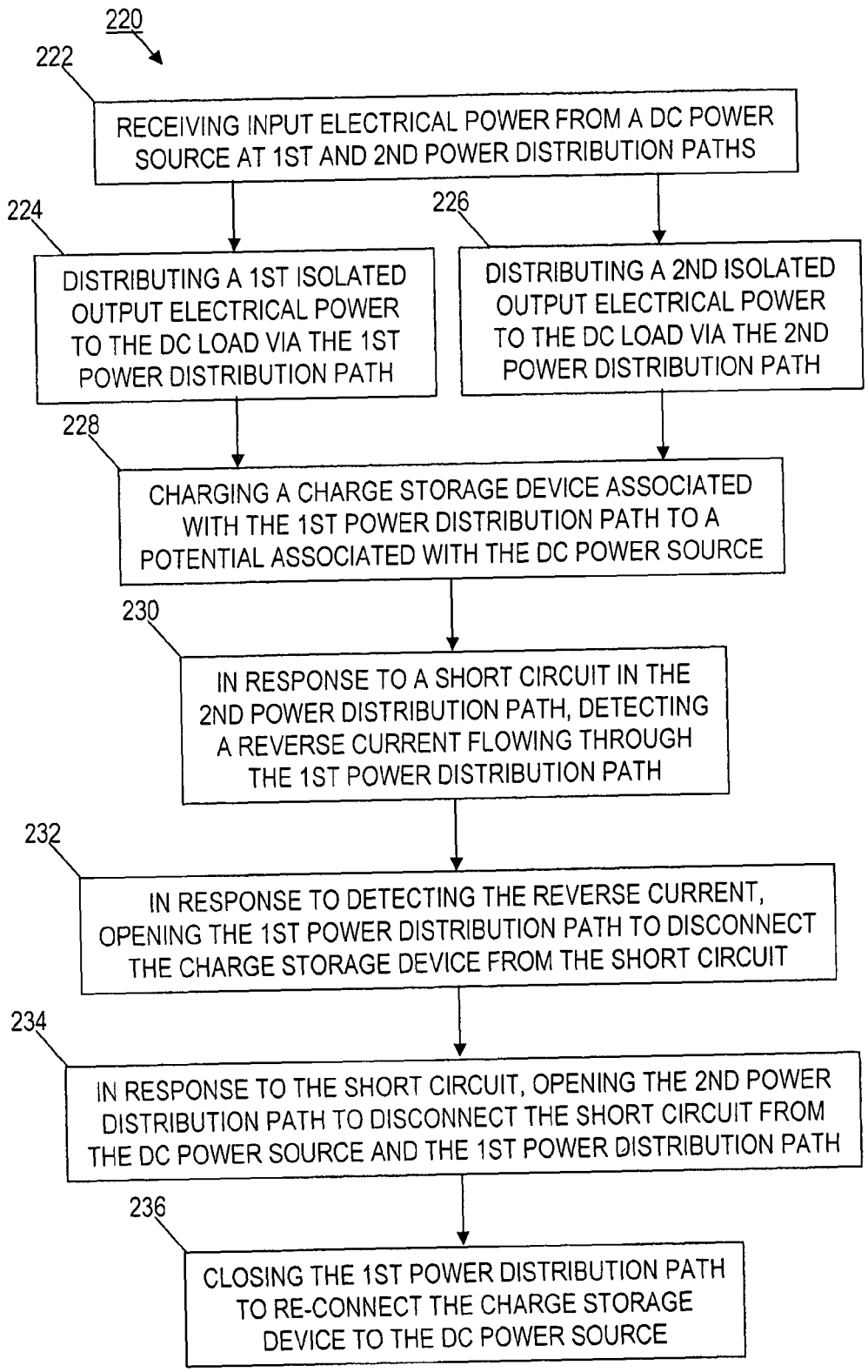
FIG. 10 is a flowchart of an exemplary embodiment of a process for distributing electrical power to a DC load according to the present invention.

With reference to FIG. 10, an embodiment of a process 220 for distributing electrical power to a DC load begins at 222 where input electrical power is received from a DC power source at a first controller module and a second controller module. At 224, a first output electrical power is distributed to the DC load via a first DC/DC module associated with the first controller module. At 226, a second output electrical power is distributed to the DC load via a second DC/DC module associated with the second controller module. The output of each DC/DC module is isolated from the input of the module. Next, a charge storage device associated with the first controller module is charged to a potential associated with an input of the first DC/DC module (228).

At 230, after a short circuit in the second controller module or an input to the second DC/DC module, a reverse current flowing through a semiconductor switch associated with the first controller module is detected. Next, in response to detecting the reverse current, the semiconductor switch is opened to disconnect the charge storage device and first DC/DC module from the second controller module (232). At 234, in response to the short circuit, a short circuit protection device associated with the second controller module is opened to disconnect the short circuit from the first controller module. Next, after the short circuit protection device opens, the semiconductor switch is closed to re-connect the charge storage device and first DC/DC module to the DC power source.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. For example, components and circuitry can be changed without changing the substantive functions performed by the components and circuitry described herein. Therefore, the inventive concept, in its broader aspects, is not limited to the specific details, the representative apparatus, and illustrative examples shown and described. Accordingly, departures may be made from such details without departing from the spirit or scope of the applicants' general inventive concept.

What is claimed is:

1. A method of distributing electrical power, including:
    a) receiving power from a DC power source and distributing parallel power via first and second power distribution paths with output isolation to a DC load;
    b) charging a charge storage device associated with the first power distribution path to a potential associated with the DC power source;
    c) in response to a short circuit in the second power distribution path, detecting reverse current flowing through the first power distribution path;
    d) in response to detecting the reverse current, opening the first power distribution path to disconnect the charge storage device from the short circuit;
    e) in response to the short circuit, opening the second power distribution path to disconnect the short circuit from the DC power source and the first power distribution path; and
    f) closing the first power distribution path to re-connect the charge storage device to the DC power source.

2. The method of claim 1, further including:
   g) isolating the first power distribution path from the DC load via a first DC/DC module; and
   h) isolating the second power distribution path from the DC load via a second DC/DC module.

3. The method of claim 1 wherein the detecting of reverse current in c) includes detecting reverse current flowing through a semiconductor switch, the opening of the first power distribution path in d) includes opening the semiconductor switch, and the closing of the first power distribution path in f) includes closing the semiconductor switch.

4. The method of claim 3, c) further including:
   g) at least partially discharging the charge storage device through the semiconductor switch until the semiconductor switch is opened;
   h) sensing a first voltage at an output of the semiconductor switch and a second voltage at an input of the semiconductor switch; and
   i) opening the semiconductor switch in response to the second voltage becoming greater than the first voltage.

5. The method of claim 3, d) further including:
   g) at least partially discharging the charge storage device through the first power distribution path with output isolation to the DC load.

6. The method of claim 3, f) further including:
   g) sensing a first voltage at an output of the semiconductor switch and a second voltage at an input of the semiconductor switch; and
   h) closing the semiconductor switch in response to the second voltage becoming greater than the first voltage.

7. The method of claim 1 wherein the opening of the second power distribution path in e) includes opening a short circuit protection device.

8. The method of claim 7 wherein the short circuit protection device includes a fuse.

9. A method of distributing electrical power to a DC load, including:
   a) receiving input electrical power from a DC power source at first and second power distribution paths;
   b) distributing a first isolated output electrical power to the DC load via the first power distribution path;
   c) distributing a second isolated output electrical power to the DC load via the second power distribution path;
   d) charging a charge storage device associated with the first power distribution path to a potential associated with the DC power source;
   e) in response to a short circuit in the second power distribution path, detecting a reverse current flowing through the first power distribution path;
   f) in response to detecting the reverse current, opening the first power distribution path to disconnect the charge storage device from the short circuit;
   g) in response to the short circuit, opening the second power distribution path to disconnect the short circuit from the DC power source and the first power distribution path; and
   h) closing the first power distribution path to re-connect the charge storage device to the DC power source.

10. The method of claim 9 wherein the detecting of reverse current in e) includes detecting reverse current flowing through a semiconductor switch, the opening of the first power distribution path in f) includes opening the semiconductor switch, and the closing of the first power distribution path in h) includes closing the semiconductor switch.

11. The method of claim 10, e) further including:
    i) at least partially discharging the charge storage device through the semiconductor switch until the semiconductor switch is opened;
    j) sensing a first voltage at an output of the semiconductor switch and a second voltage at an input of the semiconductor switch; and
    k) opening the semiconductor switch in response to the second voltage becoming greater than the first voltage.

12. The method of claim 10, f) further including:
    i) at least partially discharging the charge storage device through the first power distribution path with output isolation to the DC load.

13. The method of claim 10, h) further including:
    i) sensing a first voltage at an output of the semiconductor switch and a second voltage at an input of the semiconductor switch; and
    j) closing the semiconductor switch in response to the second voltage becoming greater than the first voltage.

14. A system, comprising:
    a first power distribution path, providing DC power to a load, where the first power distribution path includes a reverse current monitoring logic, a switch controllable by the reverse current monitoring logic, and a charge storage device between the switch and the load;
    at least one second power distribution path, providing DC power to the load in parallel with the first power distribution path; and,
    when a short circuit develops in the second power distribution path, the short circuit causes a reverse current to flow in the first distribution path from the charge storage device through the switch and through the short circuit in the second distribution path, and the reverse current is detected by the reverse current monitoring logic, and the reverse current monitoring logic opens the switch to stop the reverse current.

15. The system of claim 14, further comprising:
    the second power distribution path includes a short circuit protection device, and when a short circuit develops in the second distribution path the short circuit protection device stops current flow through the short circuit, causing the reverse current in the first distribution path to stop flowing, and the reverse current monitoring logic then closes the switch in the first distribution path.

16. The system of claim 15, the charge storage device providing power to the load during the time that the switch in the first distribution path is open.

* * * * *